Sept. 26, 1961 R. E. MARRS 3,001,850

END-DRIVEN RESILIENT RECORDING DEVICE

Filed Feb. 27, 1959 2 Sheets-Sheet 1

INVENTOR.
RALPH E. MARRS

BY Walter J. Madden Jr.

ATTORNEY

END-DRIVEN RESILIENT RECORDING DEVICE

Filed Feb. 27, 1959 2 Sheets-Sheet 2

United States Patent Office 3,001,850

Patented Sept. 26, 1961

3,001,850

END-DRIVEN RESILIENT RECORDING DEVICE

Ralph E. Marrs, Santa Clara County, Calif., assignor to International Business Machines Corporation, New York, N.Y., a corporation of New York Filed Feb. 27, 1959, Ser. No. 796,114

11 Claims. (Cl. 346—74)

The present invention relates in general to magnetic recording apparatus and relates more particularly to rotatable apparatus on which magnetic data may be recorded.

In the art of magnetic recording, large capacity recording systems often utilize a recording medium in the form of a rotatable drum having a plurality of circumferential channels or tracks thereon for storing recorded information. Such drums usually have associated therewith one or more transducers which cooperate magnetically with the moving drum for recording and reproducing the recorded data. However, the use of such drums having an inflexible recording surface presents a number of problems, especially in recording high bit or data densities, as is desirable in most data processing applications. For example, in order to obtain a high bit density it is desirable that the transducer be positioned as closely as possible to the recording surface without actually contacting the surface if the surface is moving at a high speed. To achieve this close spacing it is necessary that the outer surface of the recording drum be very accurately machined and that the drum be provided with precision bearings to produce accurate alignment of the recording surface relative to the transducers. These strict mechanical requirements result in considerable cost in producing a satisfactory drum of this type.

To overcome the above disadvantages in the use of inflexible drum surfaces, with or without flexibly mounted transducers, numerous alternative types of apparatus have been proposed. One of such alternative arrangements involves the use of a belt or endless loop of resilient material having a magnetizable coating on the outer surface thereof. This belt is disposed around, but spaced from, an inflexible inner member having openings therein for the passage of a suitable fluid, such as air, which is directed at the belt member so as to impart rotative movement thereto. The belt thus rotates under the acion of the impinging fluid and magnetically cooperates with one or more transducers disposed adjacent the belt. While this apparatus eliminates the need for high percision bearings and machining of the drum surface, it has the disadvantages that the belt requires a very large amount of relatively high pressure air for its operation, and the belt is also subject to lateral shifting while rotating. This lateral shifting results from the fact that since the belt must be free to rotate, it cannot be completely constrained laterally, and thus a certain amount of lateral movement inherently results. Such lateral shifting is a distinct disadvantage, particularly when adjacent tracks or channels are closely spaced, as is desirable in high capacity recording apparatus.

In a copending application Serial No. 756,119, assigned to the same assignee as the present application, there is disclosed magnetic recording apparatus utilizing a cylindrical drum of resilient material which has rigid face plate members mechanically connected to each end. These face plate members are mechanically driven to impart rotative movement to the resilient drum. When the drum rotates, its resilient surface flexes outwardly under the action of either centrifugal force or a fluid supplied to the interior of the drum to cause the flexible, magnetizable surface to position itself closely adjacent one or more transducers. Because of the flexibility of the recording surface and because of the air film which exists between the recording surface and the transducer, the recording surface tends to be positioned closely adjacent the transducer without actually contacting it. This construction permits considerable latitude in the concentricity and bearing requirements for a magnetic drum structure, since the flexible recording surface will tend to align itself at a substantially constant spacing from the transducer regardless of the presence or lack of concentricity in the drum bearings.

The present invention, like the invention of the above described copending application, utilizes a substantially cylindrical resilient member which has a magnetizable coating on the outer surface. One end of the member is driven to rotate the cylinder, and the other end is freely rotatable inside a ring member which forms an air bearing to support that end of the cylinder. The driven end of the cylinder may be either mechanically connected to to a driving face plate member, or alternatively, it may be coupled to this driving member by the friction produced as the cylindrical member expands under centrifugal force during rotation. The nondriven end of the drum cylinder rotates within a ring member whose inner diameter is slightly larger than the outer diameter of the drum cylinder under static conditions, so that a film of air exists between the inner surface of the ring and the drum surface to form an air bearing for the drum. One or more transducers may be positioned adjacent the drum surface between the ends thereof, and these transducers cooperate with the recording surface as it flexes outwardly when the drum rotates. Since the recording surface is flexible, it is thus positioned closely adjacent the transducers regardless of mechanical variations in the system. Also, since there is no shaft extending through the interior of the drum, removal of the drum for replacement or repair is facilitated.

It is therefore an object of the present invention to provide improved apparatus for magnetic recording.

It is a further object of the present invention to provide improved apparatus for magnetic recording utilizing a resilient cylindrical member as a recording surface.

It is a further object of this invention to provide apparatus for magnetic recording utilizing a substantially cylindrical resilient member having one end thereof driven by a driving member and having the other end rotating freely within an air bearing formed by an air bearing ring member.

It is an additional object of the present invention to provide apparatus for magnetic recording utilizing a rotating cylindrical member having a resilient recording surface which flexes under the action of centrifugal force produced by the rotation to dispose the recording surface closely adjacent an associated transducer, and in which one end of the cylindrical member is driven by a driving member and the other end of the cylindrical member rotates in an air bearing formed between the outer surface of the cylindrical member and the inner surface of an air bearing ring member.

Other objects of the invention will be pointed out in the following description and claims and illustrated in the accompanying drawings which disclose, by way of example, the principle of the invention and the best mode which has been contemplated of applying that principle.

Figure 1:
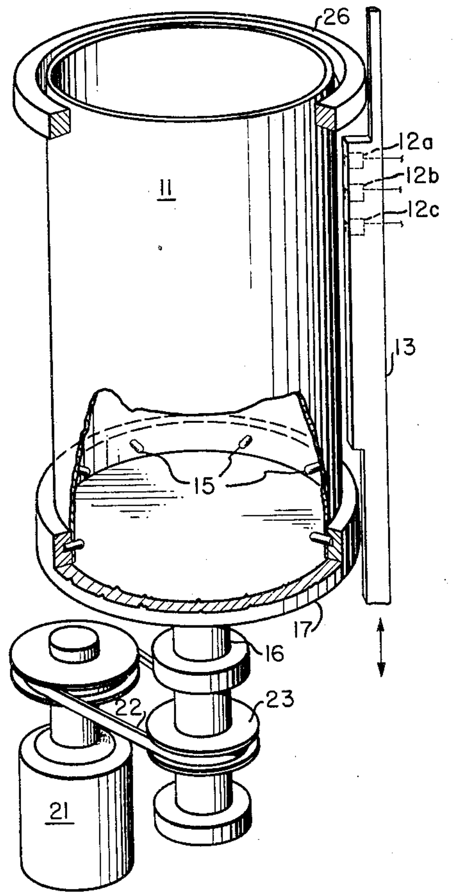
FIG. 1 is an elevational view, partly in section, illustrating one embodiment of the present invention with the drum member at rest.

Referring to FIG. 1 by character of reference, numeral 11 designates a drum forming the recording surface of the present invention. The recording surface may be a substantially cylindrical drum formed of a suitable resilient material having a magnetizable coating or layer on the outer surface thereof. Drum 11 may be formed of any suitable material having the required flexibility and strength, such as a thin sheet of plastic material sold under the trade name "Mylar," with a coating of magnetizable material, such as iron oxide, on the outer surface thereof. Alternatively, drum 11 may be formed of a thin sheet of metal or other material which has sufficient resilience to assume the desired shape during rotation. Drum 11 is preferably provided with a plurality of spaced channels or tracks around the circumference thereof for recording data.

In the embodiment illustrated in FIG. 1, drum 11 has its axis disposed vertically, although such a vertical axis is not a necessity. The recording surface cooperates with a plurality of transducers 12*a*, 12*b*, 12*c*, etc. which are mounted in a mounting bar 13 disposed adjacent the drum surface. Transducers 12 may be of any suitable type for recording and/or reproducing data from the different tracks on the surface of drum 11. Transducers 12 may be either fixed with respect to drum surface 11 or alternatively, transducers may be selectively positionable along the longitudinal axis of the drum by movement of mounting bar 13 so that the different transducers may cooperate with different tracks on the drum surface. In the case of the latter construction, by selectively positioning the transducer mounting arm 13 longitudinally of the drum surface, random access to the different tracks on the drum 11 may be obtained.

Drum 11 is mechanically rotated to move the recording surface past transducers 12*a*, 12*b*, 12*c*, etc. In the embodiment illustrated in FIG. 1, this mechanical rotation is provided through a shaft 16 which is connected to an end plate member 17. The lower end of drum 11 may be coupled to end plate member 17 by any suitable means, such as by friction or means of a clamping ring which mechanically links the drum 11 to the member 17. Alternatively, as shown in FIG. 1, drum 11 may be coupled to member 17 by pins 15 which extend through openings in the end of drum 11. The motive power source for driving drum 11 may be of any suitable type such as a motor 21 which is connected by means of a belt 22 to a sheave 23 which is secured to shaft 16 for producing rotation of shaft 16, end plate member 17 and drum 11.

Figure 2:
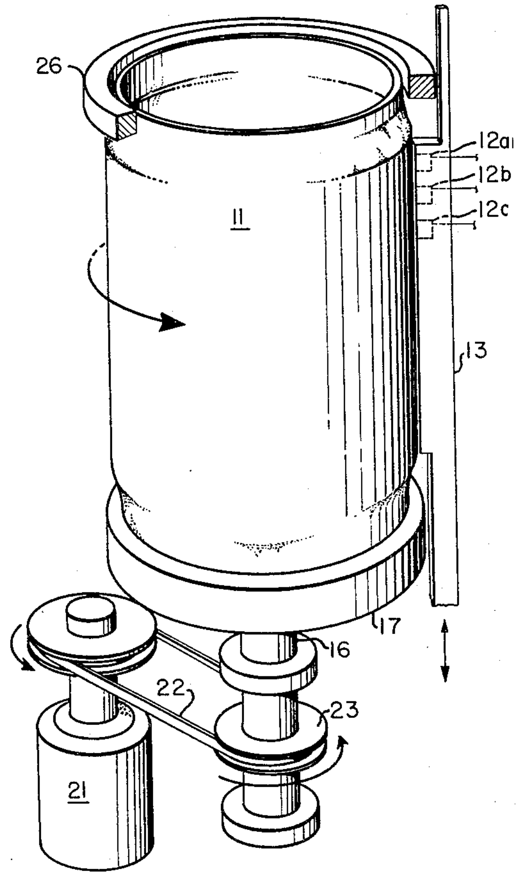
FIG. 2 illustrates the embodiment of FIG. 1 with the drum member rotating, showing the flexing of the drum surface and the formation of the air bearing.

The end of drum 11 opposite end plate member 17 is disposed inside a suitable air bearing ring member 26. As shown in FIG. 1, the inner diameter of ring member 26 is slightly larger than the outer diameter of drum 11 under static conditions, so that an air space exists between the inner surface of the ring member and the outer surface of the drum. When drum 11 is at rest or is coming up to speed, the end thereof inside ring member 26 is not necessarily circular in shape, since the material of which the drum is formed may not have sufficient rigidity to insure maintaining the circular shape in the absence of centrifugal force. When motor 21 is energized to drive end plate member 17 and drum 11, the centrifugal force resulting from the rotation causes the surface of drum 11 to flex outwardly, as shown in FIG. 2, to position the recording surface closely adjacent transducers 12*a*, 12*b*, 12*c*, etc. The centrifugal force also causes the end of drum 11 which is inside air bearing ring member 26 to tend to space itself closely adjacent ring member 26 but separated therefrom by a thin film of air which thus forms an air bearing to support that end of the drum.

It will be understood that the surface of drum 11 preferably does not actually touch transducers 12, since such contact would result in undesirable wear on both the transducers and the drum surface. To prevent such contact, the transducers may be of the type in which a stream of air is directed from the transducers toward the recording surface to maintain a spacing between these elements. Alternatively, the transducers may be of the so-called gliding head type, in which the thin film of air which is dragged around the recording surface as a result of its rotation serves as a cushion or spacer between the transducer and the recording surface.

When the gliding head type transducer is used, the laminar air flow resulting from the air drag of the moving drum surface maintains a thin film of air between the transducers and the recording surface to prevent actual contact between these elements. Thus, since the drum 11 is resilient, the outer surface thereof will tend to align itself closely adjacent transducers 12, while being maintained slightly spaced therefrom by the above described air film. Hence, even if the spacing between the drum surface and the different transducers is not constant when the drum is at rest, such as might result from variations in the mounting of the transducers in mounting arm 13, the surface of drum 11 will still be positioned closely adjacent the transducers when the drum is rotating and will be separated therefrom only by the thin film of air described above. Similarly, if there are variations or irregularities in the drum surface, or in the drum drive mechanism, such as might result from irregularities in the drum bearings or in the concentricity of the drum surface, these irregularities are compensated for by the flexing action of the drum surface while rotating to maintain the entire working surface of the drum spaced a substantially constant distance from all of the transducers during the entire rotative cycle of the drum.

Apparatus similar to that illustrated in FIGS. 1 and 2 has been tested and it has been found that a satisfactory air bearing can be formed between the end of the cylindrical drum member and the supporting ring member. In the tests, a flexible cylindrical drum member having a circumference of 12 inches was mounted with one end firmly clamped in an end plate member similar to member 17, and the other end of this resilient drum was placed in a ring member similar to ring member 26. The outer diameter of the resilient drum was approximately .010 inch less than the inner diameter of the air bearing ring member, thus allowing approximately .005 inch spacing between the drum and the air bearing member.

The apparatus was operated at a number of speeds from 0 up to 8500 r.p.m. and the air bearing, which appeared to develop at approximately 500 r.p.m. on the test apparatus, properly positioned the free end of the drum within the air bearing ring member. Further, the cross section of the drum at its air bearing end appeared to be perfectly circular, thus indicating the creation of a uniform air bearing. The drum was run at speeds between 4000 and 8000 r.p.m. for several minutes and no instability was observed in the action of the air bearing. There was no indication of frictional contact between the rotating drum member and the air bearing ring member. After the above tests with the drum surface unloaded, loads of several ounces were placed on the surface of the drum to simulate the loading of the drum by transducers. These loads were applied against the rotating surface of the drum and produced a deflection at the point of load application of .100 inch or more, but this load application did not cause any observable breakdown in the action of the air bearing at the ring member.

In connection with the apparatus illustrated in FIGS. 1 and 2, the heat generated by viscous friction in the air in the air bearing will have to be considered. Calculations indicate that heating from this cause will be an appreciable factor in the operation of a device similar to that illustrated in FIGS. 1 and 2, particularly at relatively high speeds over extended periods of time. Excessive heating at the air bearing is undesirable for a number of reasons, such as the possibility of breakdown of the air film at the air bearing as a result of thermal expansion of the drum member under the heating and deterioration of the drum material resulting from high temperature. Possible solutions to this heating problem would include lowering the mass of the drum in the vicinity of the air bearing, or making the drum of a material having a relatively low coefficient of thermal expansion, or making the drum of a material which does not lose its physical properties at slightly elevated temperatures. Additionally, of course, it will be apparent that this heating can be reduced by selecting the diameters of the drum and the air bearing ring so as to provide an optimum air bearing space between these two members, or by reducing the rotational speed of the drum to reduce the viscous air drag and hence the frictional heating of the ring member by this viscous drag.

Another solution to the problem of heating of the air bearing ring member is to insure that the outer circumference of the drum is enough smaller than the inner circumference of the air bearing ring member under all conditions to allow the continual introduction of replacement lubricating air. This condition could result naturally if the loading on the drum in the air bearing space were asymmetrical such that a portion of the air bearing was at a pressure greater than ambient and another portion of the air bearing was at a pressure less than ambient. Under these circumstances, ambient air would flow into the portion of the air bearing whose pressure was less than ambient, to thus continuously supply replacement lubricating air. However, since the circumstances necessary to produce this automatic replacement of lubricating air are not always susceptible of control, the preferred approach involves mechanical modification of the air bearing ring member to increase the flow of lubricating air.

Figure 3:
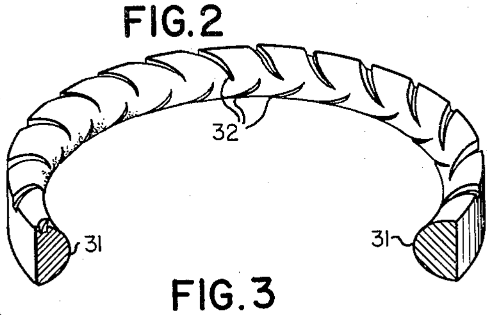
FIG. 3 illustrates an alternative embodiment of an air bearing ring member to provide additional air flow through the air bearing.

FIG. 3 illustrates one form of special air bearing ring member which may be utilized to increase the air flow through the air bearing to provide replacement lubricating air. The ring member 31 is substantially cylindrical in shape, and is provided on its inner surface with a plurality of grooves or channels 32. These grooves or channels may be of any suitable configuration, and in the embodiment illustrated in FIG. 3, they have a herringbone pattern. As the end of drum 11 rotates within ring member 31, the viscous properties of the rotating air in the air film between the end of drum 11 and ring member 31 causes replacement air to be pulled into the bearing through grooves 32. The ring 31 and grooves 32 thus act as a viscous pump to pump replacement air into the pressurized bearing space, to thus provide a continuous replacement lubricating air supply for the air bearing.

Figure 4:
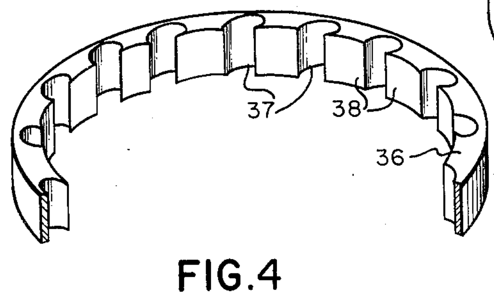
FIG. 4 illustrates an additional alternative embodiment of the air bearing ring member to provide increased air flow over the air bearing surface.

FIG. 4 illustrates an additional alternative form of air bearing ring member for providing increased air flow into the air bearing member. The air bearing ring member 36 is substantially cylindrical in shape and is provided with a plurality of channels 37 on the inner surface thereof. Channels 37 are joined to each other by surfaces 38 which may be either flat or slightly concave to provide load carrying ability for the air film between drum 11 and ring member 36. The channels 37 act as supply channels to supply ambient air into the air bearing space, while the surfaces 38 serve as load carrying surfaces to support the drum 11 by means of the air bearing.

Figure 5:
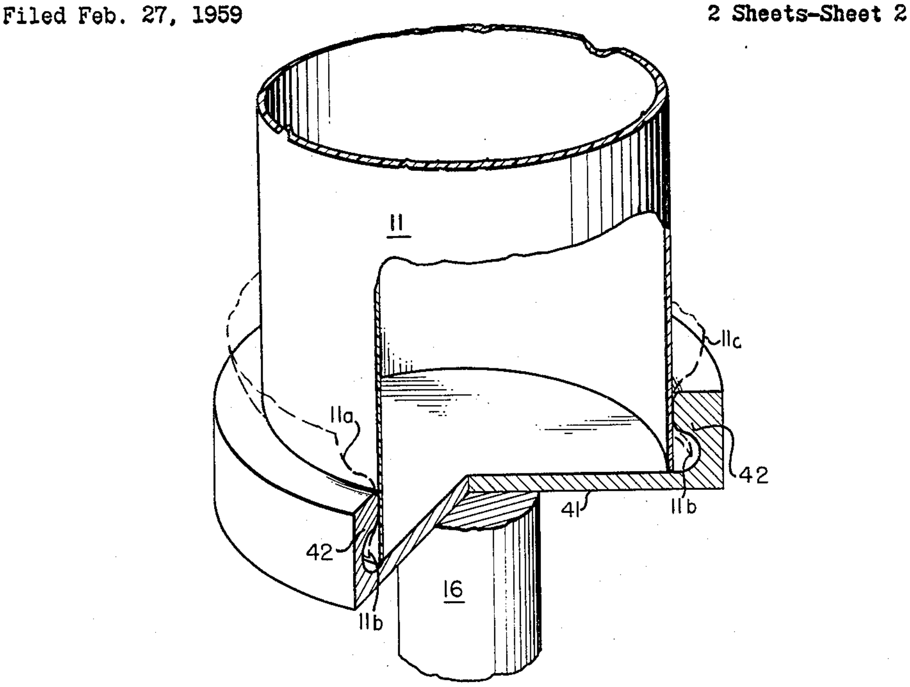
FIG. 5 illustrates a configuration of the driving end bell member which provides improved frictional gripping of the driven end of the drum.

In the embodiment illustrated in FIGS. 1 and 2, pins 15 were utilized to secure drum 11 in the driving ring member 17. As an alternative to the use of such pin members, drum 11 may be coupled by friction to the driving end bell member in a manner similar to that illustrated in FIG. 5. In FIG. 5, the driven end of drum 11 is disposed within a driving end bell member 41 which may be driven by shaft 16. Drum 11 is adapted to fit with a slight clearance under static conditions into the opening formed in end bell 41. End bell 41 is provided with a protruding ring portion 42 having a rounded surface thereon which produces a recessed portion between the protruding ring member 42 and the body of end bell 41. In the static condition, drum 11 occupies the position shown in solid lines in FIG. 5, with the end of the drum resting on the body of end bell 41 and the surface of the drum slightly spaced from protruding ring member 42. When shaft 16 is driven to drive end bell 41, the slight frictional contact between drum 11 and the bottom of end bell 41 will cause drum 11 to rotate with the end bell. It will be seen that as drum 11 rotates the centrifugal force will cause the surfaces of the drum to expand outwardly. Part of this expansion will occur in a portion **11*a* of the drum, and this expansion will produce a force tending to pull the end of drum 11 out of the driving end bell. However, this force tending to pull the drum out of the driving end bell is substantially cancelled by the force in the portion 11*b*, which portion is pushed inwardly by centrifugal force into the recess under protruding ring 42. Thus, the frictional force on the drum in protruding ring portion 42 holds the drum firmly in position and prevents pulling out of the drum from the end bell member 41**.

Figure 6:
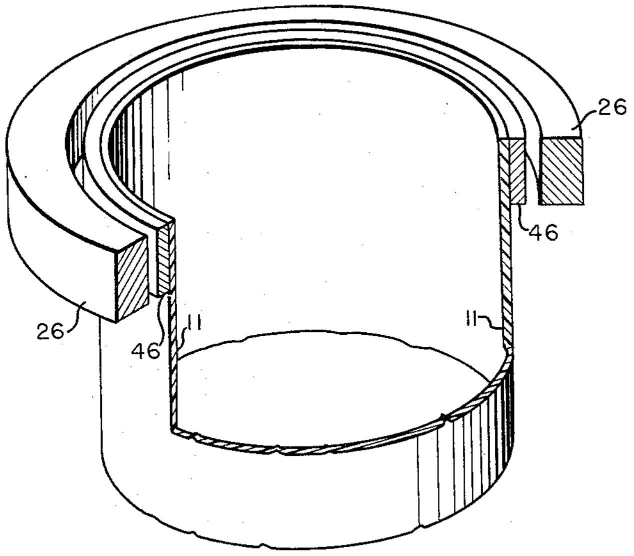
FIG. 6 illustrates the use of a stiffening member to insure that the air bearing end of the drum maintains its circular cross section.

In the above discussions describing the different embodiments in the invention, it has been assumed that the material of which drum 11 is formed has sufficient rigidity to insure that the end of the drum which is inside the air bearing ring member will maintain a substantially circular cross section while rotating, to produce an air bearing of substantially uniform thickness between this end of the drum and the air bearing ring member, and this assumption appears to be born out by the experimental work described above. However, it may be desirable under some circumstances to stiffen the air bearing end of drum 11 to insure that this end maintains its circular cross section during rotation. FIG. 6 illustrates one manner of providing this stiffening on the end of drum 11 which is disposed inside the air bearing ring member 26. The air bearing end of drum 11 is provided with a stiffening hoop or ring 46 which is cemented or otherwise secured to the end of drum 11 for providing additional rigidity to maintain the desired circular cross section of this end of the drum. Stiffener 46 may be of any suitable width, such as the width of the air bearing ring member 26, and may be of any suitable thickness, but preferably it is of the minimum thickness which will still provide the desired rigidity for this end of the drum. As shown in FIG. 6, stiffening member 46 will rotate inside the air bearing ring member 26 so that the air bearing will be formed between the inner surface of ring 26 and the outer surface of stiffening ring 46.

As an additional alternative embodiment, it will be apparent that drum 11 may be provided with magnetizable record surfaces on both its inside and outside surfaces. Since the air bearing end of the drum is open, a mounting arm similar to arm 13 may extend through this open end and be disposed adjacent the inner surface of the drum so as to position one or more transducers adjacent the record surface. This will essentially double the recording capacity of the drum without adding any substantial size or complexity to the apparatus. When such a construction is used, it is important that the two recording surfaces be magnetically separated to an extent sufficient to prevent any "bleeding" of magnetic information from one record surface to the other.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for use in magnetic recording comprising a substantially cylindrical resilient member having a magnetizable material on one surface thereof, means mechanically connected to one end of said member for rotating said member at a predetermined speed, and an air bearing ring member disposed around but spaced from the other end of said cylindrical member to form an air bearing for supporting said other end as said resilient member expands during rotation of said cylindrical member.

2. Apparatus for use in magnetic recording comprising a substantially cylindrical resilient member having a magnetizable material on the outer surface thereof, means mechanically connected to one end of said member for rotating said member at a predetermined speed, and an air bearing ring member disposed around but spaced from the other end of said cylindrical member to form an air bearing for supporting said other end as said resilient member expands during rotation of said cylindrical member.

3. Apparatus for use in magnetic recording comprising a substantially cylindrical resilient member having a magnetizable material on one surface thereof, means mechanically connected to one end of said member for rotating said member at a predetermined speed, an air bearing ring member disposed around but spaced from the other end of said cylindrical member to form an air bearing for supporting said other end as said resilient member expands during rotation of said cylindrical member, and transducer means disposed adjacent said cylindrical member for magnetically cooperating therewith during said rotation.

4. Apparatus for use in magnetic recording comprising a substantially cylindrical resilient member having a magnetizable material on each surface thereof, means mechanically connected to one end of said member for rotating said member at a predetermined speed, and an air bearing ring member disposed around but spaced from the other end of said cylindrical member to form an air bearing for supporting said other end as said resilient member expands during rotation of said cylindrical member.

5. Apparatus for use in magnetic recording comprising a substantially cylindrical resilient member having a magnetizable material on one surface thereof, means mechanically connected to one end of said member for rotating said member at a predetermined speed, and an air bearing ring member disposed around but spaced from the other end of said cylindrical member to form an air bearing for supporting said other end as said resilient member expands during rotation of said cylindrical member, said ring member having a plurality of openings therein for introducing air into the air bearing space.

6. Apparatus for use in magnetic recording comprising a substantially cylindrical resilient member having a magnetizable material on one surface thereof, means mechanically connected to one end of said member for rotating said member at a predetermined speed, and an air bearing ring member disposed around but spaced from the other end of said cylindrical member to form an air bearing for supporting said other end as said resilient member expands during rotation of said cylindrical member, said ring member having a plurality of transverse grooves therein for introducing air into the air bearing space.

7. Apparatus for use in magnetic recording comprising a substantially cylindrical resilient member having a magnetizable material on one surface thereof, means mechanically connected to one end of said member for rotating said member, and an air bearing ring member disposed around but spaced from the other end of said cylindrical member to form an air bearing for supporting said other end as said resilient member expands during rotation of said cylindrical member at a predetermined speed, said ring member having a plurality of spaced openings joined by support surfaces for introducing air into the air bearing space.

8. Apparatus for use in magnetic recording comprising a substantially cylindrical resilient member having a magnetizable material on the outer surface thereof, means mechanically connected to one end of said member for rotating said member at a predetermined speed, and an air bearing ring member disposed around but spaced from the other end of said cylindrical member to form an air bearing for supporting said other end as said resilient member expands during rotation of said cylindrical member, said ring member having a plurality of openings therein for introducing air into the air bearing space.

9. Apparatus for use in magnetic recording comprising a substantially cylindrical resilient member having a magnetizable material on one surface thereof, means mechanically connected to one end of said member for rotating said member at a predetermined speed, a stiffening member secured to the other end of said resilient member, and an air bearing ring member disposed around but spaced from the said stiffening member to form an air bearing for supporting said other end as said resilient member expands during rotation of said cylindrical member.

10. Apparatus for use in magnetic recording comprising a substantially cylindrical resilient member having a magnetizable material on one surface thereof, means frictionally connected to one end of said member for rotating said member at a predetermined speed, and an air bearing ring member disposed around but spaced from the other end of said cylindrical member to form an air bearing for supporting said other end as said resilient member expands during rotation of said cylindrical member.

11. Apparatus for use in magnetic recording comprising a substantially cylindrical resilient member having a magnetizable material on one surface thereof, a rotatable driving end bell for receiving one end of said resilient member to drive said member at a predetermined speed, said end ball having a protruding portion extending around the interior thereof for engaging said resilient member to hold said resilient member firmly when said end bell rotates, and an air bearing ring member disposed around but spaced from the other end of said cylindrical member to form an air bearing for supporting said other end as said resilient member expands during rotation of said cylindrical member.

References Cited in the file of this patent

UNITED STATES PATENTS

| | | |
|---|---|---|
| 2,627,443 | Becker | Feb. 3, 1953 |
| 2,687,595 | McRoskey | Aug. 31, 1954 |
| 2,787,750 | Jones | Apr. 2, 1957 |
| 2,864,552 | Anderson | Dec. 16, 1958 |
| 2,889,474 | Macks | June 2, 1959 |
| 2,899,260 | Farrand et al. | Aug. 11, 1959 |